(12) United States Patent
Barnes

(10) Patent No.: US 7,523,850 B2
(45) Date of Patent: Apr. 28, 2009

(54) METHOD OF FORMING AND BLANK THEREFOR

(75) Inventor: Anthony John Barnes, Crestline, CA (US)

(73) Assignee: Luxfer Group Limited, Salford (GB)

( * ) Notice: Subject to any disclaimer, the term of this patent is extended or adjusted under 35 U.S.C. 154(b) by 103 days.

(21) Appl. No.: 10/408,136

(22) Filed: Apr. 7, 2003

(65) Prior Publication Data

US 2004/0197532 A1 Oct. 7, 2004

(51) Int. Cl.
*B23K 20/12* (2006.01)

(52) U.S. Cl. ................................... 228/112.1

(58) Field of Classification Search ............... 228/112.1, 228/2.1, 155
See application file for complete search history.

(56) References Cited

U.S. PATENT DOCUMENTS

| | | | |
|---|---|---|---|
| 3,984,260 A | 10/1976 | Watts et al. | |
| 3,997,369 A | 12/1976 | Grimes et al. | |
| 4,033,794 A | 7/1977 | Stowell et al. | |
| 4,092,181 A | 5/1978 | Paton et al. | |
| 4,486,242 A | 12/1984 | Ward et al. | |
| 5,400,633 A | 3/1995 | Segal et al. | |
| 5,971,252 A * | 10/1999 | Rosen et al. ............. | 228/112.1 |
| 6,053,391 A | 4/2000 | Heideman et al. | |
| 6,185,977 B1 * | 2/2001 | Schiessl et al. ............ | 72/342.1 |
| 6,209,379 B1 | 4/2001 | Nishida et al. | |
| 6,273,323 B1 * | 8/2001 | Ezumi et al. ............. | 228/112.1 |
| 6,315,187 B1 * | 11/2001 | Satou et al. ............. | 228/112.1 |
| 6,471,112 B2 * | 10/2002 | Satou et al. ............. | 228/112.1 |
| 6,537,682 B2 | 3/2003 | Colligan | |
| 6,543,671 B2 * | 4/2003 | Hatten et al. ............ | 228/112.1 |
| 6,572,007 B1 * | 6/2003 | Stevenson et al. ........ | 228/112.1 |
| 6,655,575 B2 * | 12/2003 | Mishra .................... | 228/112.1 |
| 6,712,916 B2 * | 3/2004 | Mishra et al. ............. | 148/564 |
| 6,722,555 B2 * | 4/2004 | Ezumi et al. ............. | 228/112.1 |
| 6,726,085 B2 * | 4/2004 | Litwinski et al. ......... | 228/112.1 |
| 6,733,900 B2 * | 5/2004 | Satou et al. ................ | 428/615 |
| 6,777,107 B2 * | 8/2004 | Satou et al. ................ | 428/615 |
| 6,857,555 B2 * | 2/2005 | Ishida et al. ............ | 228/112.1 |
| 2002/0027154 A1 * | 3/2002 | Satou et al. ............. | 228/112.1 |
| 2002/0079351 A1 | 6/2002 | Mishra et al. | |
| 2003/0000624 A1 | 1/2003 | Krajewski et al. | |
| 2003/0000996 A1 * | 1/2003 | Satou et al. ............. | 228/112.1 |
| 2003/0000997 A1 * | 1/2003 | Satou et al. ............. | 228/112.1 |
| 2003/0042292 A1 * | 3/2003 | Hatten et al. ............. | 228/112.1 |
| 2003/0192941 A1 * | 10/2003 | Ishida et al. ............. | 228/112.1 |
| 2004/0055349 A1 * | 3/2004 | El-Soudani .................... | 72/56 |
| 2004/0074949 A1 | 4/2004 | Narita et al. | |
| 2004/0195293 A1 * | 10/2004 | Hamada et al. ............. | 228/103 |
| 2004/0197159 A1 * | 10/2004 | Ishida et al. ................ | 409/134 |
| 2005/0011933 A1 * | 1/2005 | Grong ......................... | 228/165 |

FOREIGN PATENT DOCUMENTS

| | | |
|---|---|---|
| EP | 1162283 | 3/2001 |
| EP | 1245325 | 2/2002 |
| EP | 1 245 325 | 10/2002 |
| JP | 11 047 859 | 2/1999 |
| JP | 2000-237882 | 9/2000 |
| JP | 269779 | 2/2001 |
| JP | 178170 | 6/2002 |
| JP | 2002-292435 | 10/2002 |
| WO | WO93/10935 | 6/1993 |
| WO | 02/070186 | 9/2002 |

OTHER PUBLICATIONS

Mishra, et al., High Strain Rate Superplasticity in Friction Stir a Processed 7075 Al Alloy, Scripta mater. 42 (2000) 163-168.*
Mishra, et al., Friction Stir Processing: A New Grain Refinement Technique to Achieve High Strain Superplasticity in Commerical Alloys, Superplasticity in Advanced Materials, ICSAM-2000 Materials Science Forum, 357-3 (2001) 507.*
International Search Report and Written Opinion of the International Searching Authority for International Application No. PCT/GB2004/001491; mailed on Jul. 28, 2004.
On Some Fundamental Aspects of Superplastic Flow 8401-004.
Experimental Observations In Superplasticity Terence G. Langdon.
Superplasticity K.A. Padmanabhan G.J. Davis.
Superplastic Forming Los Angeles, CA Mar. 22, 1984.

* cited by examiner

*Primary Examiner*—Kiley Stoner
(74) *Attorney, Agent, or Firm*—Volpe and Koenig, P.C.

(57) ABSTRACT

A method of forming and a blank therefor, in which the blank comprises a parent body and an insert, at least one of which is made of a material which possesses superplastic properties. The insert is joined to the parent body by friction stir welding. The primary purpose of the invention is to provide a blank for a forming process during which some parts of the blank are required to deform to an extent which requires superplastic properties, whereas the remaining parts of the blank are deformed to a lesser extent.

10 Claims, 3 Drawing Sheets

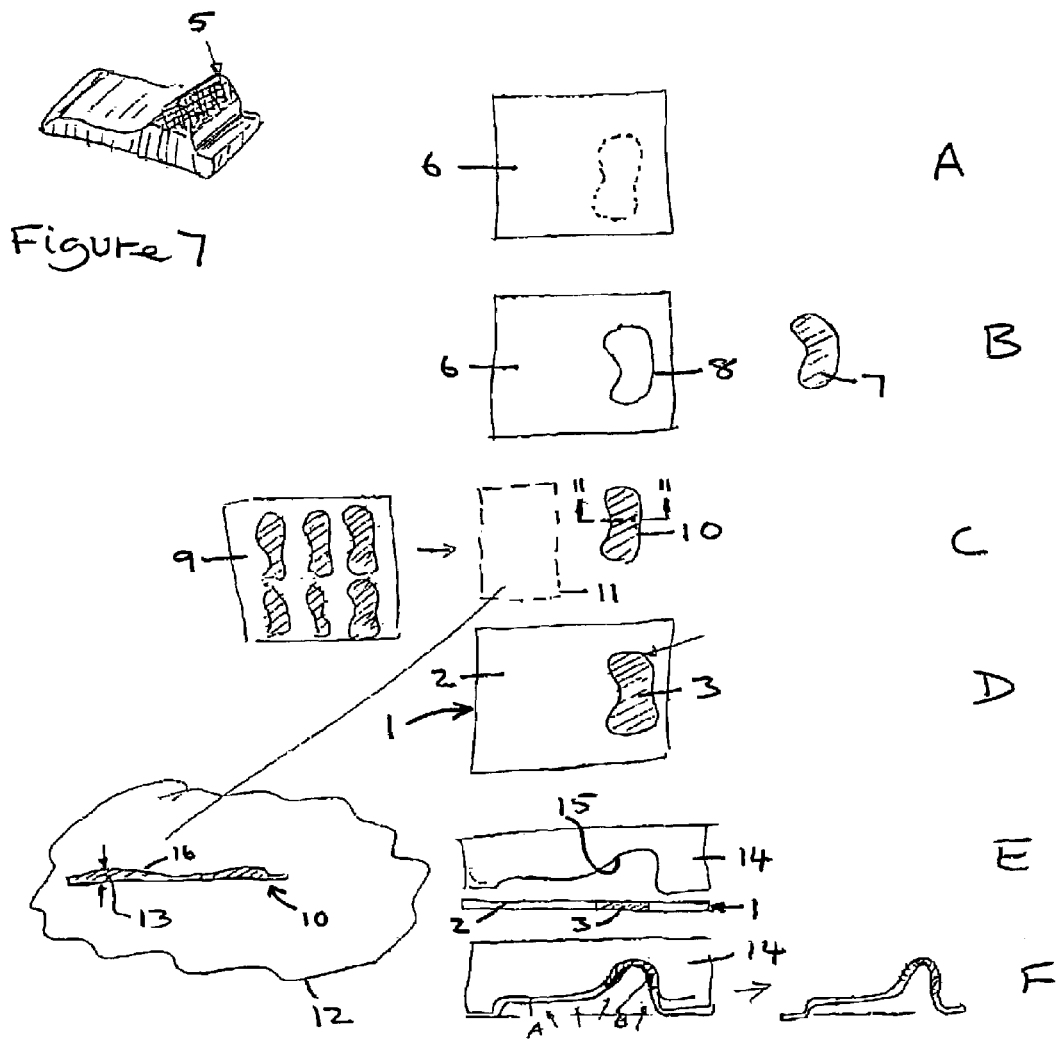

METHOD OF FORMING AND BLANK THEREFOR

Figure 1:
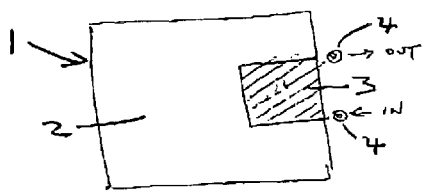

This invention relates to a method of material forming to produce shaped parts, and to a blank for use in such forming. The invention is particularly directed to the superplastic forming (SPF) process utilising certain materials, primarily metallic, which exhibit superplastic properties.

Superplasticity can be defined in various different ways, but generally it is. A property exhibited by certain materials whereby they are able, at an appropriate temperature and strain rate, typically in the range $10^{-3}$ to $10^{-4}$, to undergo plastic deformation to very large (eg 200% or more) elongations under tension without rupture. High strain rate superplasticity may be defined as a minimum strain rate of $10^{-2} S^{-1}$ and is typically found in materials produced by Equal Channel Angular Pressing (ECAP) or friction stir processing (FSP). Materials which possess superplastic properties may be formed, using processes such as SPF, into complex 3D shapes such as are needed in the aerospace and automotive industries.

Several materials exhibit superplastic properties, but only a relatively small number find commercial applications. These include certain alloys of aluminium, titanium and nickel. Various methods can be used to achieve the fine grain microstructure which is necessary for materials to exhibit superplasticity. Unfortunately these methods usually involve quite complex and expensive processing to convert a base material, which does not possess superplastic properties at all or only to a small extent, into one which does possess the required superplastic properties. For example, U.S. patent application No. 2002/0079351 describes a technique in which superplastic properties are generated locally in a parent metal using friction stir welding (FSW). The blank thus created can thence be deformed to create a desired 3D article by a forming process such as forging, rolling, drawing, bending, extruding, gas forming, punching or stamping. That part of the blank which has been rendered superplastic by the FSW is sufficiently ductile to deform to the required shape whereas the remainder of the blank is not.

Friction stir welding is a relatively new technique. The basic process is described, for example, in WO93/10935 and is typically used to join two workpieces. The process involves plunging a rotating or reciprocating probe into the workpiece to be joined, and moving the probe along the line of the join. The heat generated by the frictional engagement of the probe with the workpieces generates an area of plasticised material which, after passage of the probe, joins across the join line to weld the workpieces together.

In the present invention, we seek to achieve a blank which is functionally similar to that obtained in the process described in the above-mentioned U.S. patent application No. 2002/0079351 in that it comprises a limited area within the parent metal which has superplastic properties and which thus, during a subsequent forming process, will readily deform to produce the required shape, leaving the remaining material either not deformed at all, or deformed only to a limited extent within its plastic capabilities. The technique of the present invention leads, however, to a number of advantages over the prior-art process, which advantages will become apparent in the following description.

According to a first aspect of the invention there is provided a method of preparing a blank for superplastic forming, said method comprising the steps of joining an insert to a parent body by means of friction stir welding, at least one of the parent body and the insert being made of a material which has superplastic properties.

Any suitable method of forming can be used, such as those listed above, but the preferred method is superplastic forming at elevated temperature with pressurised fluid, as will be described in more detail below.

In accordance with a second aspect of the invention there is provided a blank for use in a superplastic forming process in which a limited region or regions of the blank are required to deform to a greater extent than the remainder, said blank comprising a parent body and an insert joined thereto by means of friction stir welding, at least one of the parent body and the insert being made of a material which has superplastic properties, and wherein that part of the blank which has said superplastic properties is positioned so as to correspond to a respective limited region.

The use of the terms "parent body" and "insert" are not intended to simply any particular size relationship between the two, but are used simply to enable the two parts to be readily distinguished. It will, however, often be the case that the part of the blank that is superplastic will be the smaller in size since investigation has shown that, in many cases, it is only a relatively small proportion of a blank that is subjected to deformation, during the forming process, of sufficient magnitude to warrant the need for a superplastic material. Thus, fabricating the whole blank of superplastic material is often unnecessary and, since such materials are more expensive to produce, costs can be saved by using as little as possible of the superplastic material. However, we do not wish to exclude the possibility that the remainder of the blank is also of superplastic material and, indeed, the degree of superplasticity of the parent body, whilst normally different to that of the insert, may in certain circumstances be of a similar level to or equal to that of the insert.

In the preferred embodiment it is the insert that is formed of superplastic material, and the parent body is formed from a material which is either not superplastic at all, or is superplastic to a lesser extent. For simplicity of description, this arrangement will be assumed hereafter. Thus, during the forming process, there are two possibilities:—

1) The parent body remains undeformed during the forming process, deformation only occurring within the insert;
2) Both the parent body and the insert are deformed during the forming process, but the insert is positioned in that region which requires an amount of deformation sufficient to warrant the use of a superplastic material, the remaining parts being deformed to a lesser extent than this.

The blank may be formed of multiple inserts, each frequency stir welded to the parent body. Some or all of these inserts may be made out of superplastic material. In addition, the or each insert may further be provided with means whereby it may perform a mechanical function, for example stiffening or providing a threaded bore for a fastening in the finished part.

The or each insert may be positioned in relation to the parent body in various different ways. For example an insert may simply abut one edge of the parent body and be joined along the abutting edge. Alternatively, the parent body may be cut out to receive the insert, either by way of slot opening into an edge of the parent body, or by way of a closed cut-out in the parent body. In a further alternative, the insert may overlie the parent body and be joined thereto, thus forming a two-layered composite structure in the area of the insert. Such an insert may more properly perhaps be referred to as a patch, since it is not "inserted" into an opening in the parent body. Thus the word "insert" as used herein should be construed with this in mind. Where a two-layered region is formed by a patch-type insert, care needs to be taken with the properties of the underlying material of the parent body; clearly the superplasticity of the two-layered structure is dictated by both layers, and if the plasticity of the parent body, at least in the region concerned, is not the same as or similar to that of the insert, then the overall superplasticity may be impaired. In a still further alternative, an insert and a patch may be used, by joining a patch in such a way as to wholly or partially overlie an existing insert thus forming, in effect, a composite insert comprising two layered parts. In practice, both parts of such a composite insert may be joined to the parent body in a single FSW operation.

A particular benefit of friction stir welding as a joining method is that it is a solid state process in which there is no melting, unlike conventional fusion welding where melting occurs. Accordingly the superplastic properties of the or each insert are not impaired during the joining process; indeed in the immediate area of the join they may be enhanced. In addition the area of superplasticity may be extended for a short distance into the parent body (see the above-mentioned U.S. patent application No. 2002/0079351). By contrast, fusion welding creates a cast material in the area of the join, together with heat-affected areas leading to reduced ductility.

The or each insert may or may not be the same thickness as the parent body. In one embodiment the insert is thicker than the parent body, but tapers at its edges so as to avoid a step where it joins the parent body. Such a step would be undesirable in the event that FSW is used since the FSW tool is normally waisted and thus a substantially equal thickness on each side of the join is desirable, although techniques for FSW welding of sheets presenting different thicknesses along the line of the join are now available.

One or both surfaces of the insert may be contoured to achieve particular desired properties, as will be explained in more detail hereinafter.

Making the insert thicker and/or contouring the surface of the insert is usually carried out either to compensate for local thinning of the material during forming, or for mechanical reasons such as a requirement for local stiffening, or the need to secure a fastening. It will be seen that, where thinning is a particular concern, the parent body and the insert may both have superplastic properties and moreover, the superplasticity of the insert may be little, or even no, greater than that of the parent body. Generally speaking however, as already mentioned, the superplasticity of the insert will be greater than that of the parent body.

Where there are multiple inserts, they may have different thickness, according to the particular requirement at their location; likewise some may be contoured, others not, or there may be a mixture of contouring and different thicknesses amongst the various inserts.

As well as having a higher degree of superplasticity from the parent body, the or each insert may be in a different metallurgical condition, for example may have a different temper, degree of hardening or grain size. It may also have a different chemical composition, or may even be a different material entirely.

The preferred shape of the blank is sheet-like or plate-like, but it could be tubular, or an extrusion or casting, depending upon the circumstances. The component parts making up the blank—i.e. parent body and insert(s) will be shaped to give the required final shape to the blank. The thickness of the materials used to fabricate the blank are selected to meet the particular requirements of use. FSW has been demonstrated to work down to a thickness of about 1.2 mm and, at the upper end, pneumatic superplastic forming of plates 10 mm thick or possibly thicker still can be contemplated. Such thick plates can be readily joined by friction stir welding but for superplastic forming the material would preferably incorporate materials having a grain size of 10 microns or less, preferably 5 microns or less, which inherently have very low flow stress making, for example, pneumatic forming, a realistic possibility.

The most likely materials for the components of the blank are metallic materials such as aluminium, but plastics materials are also possible.

The time needed to form a sheet metal part by SPF is dictated by the superplastic characteristics of the starting sheet, the process conditions (temperature and applied pressure) and the degree of strain required to stretch the sheet into conformance with the mould. Superplastic deformation is achieved over a discrete strain rate range within which the material exhibits a high strain rate sensitivity. For a given alloy this superplastic strain rate range can be modified by the prevailing grain size. Within limits larger grains: slower forming, finer grains: faster forming. Additionally, finer grain size results in a lower flow stress for a given rate of forming. This knowledge has led to the development of "high strain rate" fast forming superplastic alloys. Such alloys may be of conventional composition but have been thermo-mechanically processed by processes such as "equal channel angular pressing" (ECAP) or "friction stir processing" (FSP) to yield ultra fine stable grain size, or they have been produced by exotic processing methods such as mechanical alloying and physical vapour deposition.

These "fast forming" alloys have some common limitations. They are expensive to produce and have not, at least as yet, shown the ability to be easily scaled up to produce full size sheets. These limitations have meant that their promise of faster superplastic forming for commercial parts production has not been realised.

The present invention enables the utilisation of these "fast forming" materials as local inserts in regions of higher strains within a more cost-effective larger sheet of "regular" superplastic alloy or conventional non-superplastic material. This allows the "combination sheet" to form more quickly and for the high cost of the insert material, to have limited impact on overall cost.

In order that the invention may be better understood, several embodiments thereof will now be described by way of example only and with reference to the accompanying drawings in which:

FIGS. 1 to 4 are diagrammatic plan views of rectangular blanks suitable for use in the method of the present invention;

FIGS. 5A, B and C are views similar to those of FIG. 1, showing three further configurations of blank;

FIGS. 6A to F illustrate the sequence of steps in a typical forming method according to the invention;

FIG. 7 is a diagrammatic perspective view of the shaped part to be made using the method illustrated in FIG. 6; and FIGS. 8A-F are a series of sectional views for the purpose of clarifying the manner in which an insert may be joined to a parent body of sheet-like material.

Referring firstly to FIG. 1, there is shown a blank 1 of rectangular shape, and made out of sheet material. It will be understood that the size and shape of the blank will be dictated by the individual requirements and will not necessarily be as shown.

The blank has a composite structure comprising a parent body 2 and an insert 3, the latter being shown shaded. The join between the insert and the parent body 2 is made by welding, using the technique of friction stir welding. Friction stir welding is effected by passing a rotating or reciprocating tool along the joint line, and this is illustrated diagrammatically in FIG. 1, with the tool being represented by the reference 4. In the case of a rotating tool, the tool 4 rotates about an axis which is vertical or near vertical to the general plane of the blank and is moved into the joint at the arrow marked IN, thence round the join line, and exits the joint at the arrow marked OUT.

As will be explained in more detail below, the blank illustrated in FIG. 1 is subject to a hot forming operation to produce a 3D article of desired shape. During this operation the material of the bank will be deformed and the inherent plasticity of the material of the blank is relied upon during this deformation. However, the inherent plasticity may not be sufficient to produce complex shapes, including such features as sharp curves and corners, and here a material having superplastic properties may be required. In practice, it is often the case that only a part of the blank needs to have superplastic properties, since the remainder of the blank is either not deformed at all during the forming process, or is deformed only to an extent that is within its inherent capabilities. In such cases, it is clearly wasteful to provide a blank which is made wholly of the expensive superplastic material when only a small part is subject to deformation sufficient to need superplastic properties.

The blank illustrated in FIG. 1 meets this requirement by providing that just a part of the blank, namely the insert 3 is made of a material having superplastic properties. The parent body 2 can be of conventional sheet material, although the invention does not preclude the possibility that the parent body also has superplastic properties, but to a lesser extent. Thus, in a particular example, the parent body 2 is made of low-cost conventional aluminium alloy sheet, whereas the insert 3 is made from a more expensive superplastic aluminium alloy. Note, however, that the insert and the parent body do not both have to be of the same material (aluminium in this case); the insert could be a superplastic variety of some other material.

The insert 3 is made of such a size and shape, and is positioned with respect to the parent body 2, such that it corresponds to that area of the blank 1 which requires superplastic properties. In addition, it will be seen from the above-referred to patent application No. U.S. 2002/0079351 that the use of FSW can itself create or enhance superplastic properties in a material which would otherwise not possess such properties, and it will thus be seen that the area of superplasticity might in fact be extended into the parent body 2 in the immediate vicinity of the weld line during the FSW process.

The exact shape and location of the insert with respect to the parent body can be determined in various ways. For example computational simulation methods such as non-linear finite modelling may be used to analyse the variation of thickness that will result during the forming process. The contoured thickness and location of the insert necessary to achieve a uniform final thickness after deformation can then be calculated. Alternatively, forming trials may be performed using a biaxial grid marked sheet to determine regions of high strain in the formed part, and the origin of these regions on the unformed flat sheet.

Figure 2:
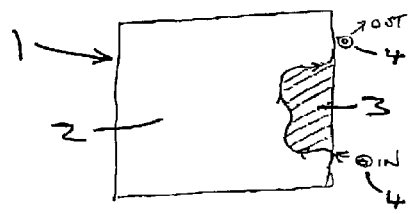
Figure 3:
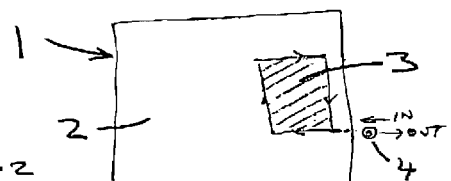
Figure 4:
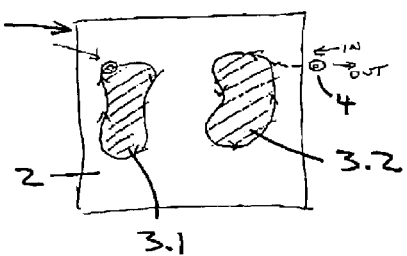

FIGS. 2 to 4 illustrate various blanks having differently shaped and/or positioned inserts 3. The blank shown in FIG. 2 is the same as that shown in FIG. 1, except that the insert 3 has a different shape. The blank shown in FIG. 3 has an insert 3 which is completely surrounded by the material of the parent body 2. In this case the route of the FSW tool 4 is as shown, being shown dotted where the route passes through the material of the parent body 2 and in solid where it passes round the joint line itself. Since a complete passage round the joint line returns the FSW tool to the point at which it started, it is most convenient to have the tool leave the blank by the same route as it entered. The blank shown in FIG. 4 has two inserts 3.1 and 3.2, each being shaped as required for the particular application. Each insert is joined around its perimeter to the parent body 1 by FSW. In the case of insert 3.1, the FSW tool 4 is plunged into the joint line at some point, then moved around the joint line and back to the same point, at which point the tool is removed and the resultant hole plugged. In the case of insert 3.2, the same technique as is used in the blank of FIG. 3 is used to effect welding of the joint.

Figure 5:
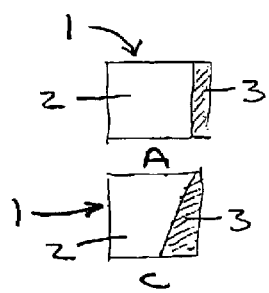

FIG. 5 shows 3 more blanks suitable for use with the method of the present invention, each of these having differently shaped and positioned inserts. It will be understood that these inserts will be joined to the parent body by FSW; in the case of the embodiment shown in FIG. 5B, this will involve two separate welds. The thickness of the or each insert 3 may be the same as or different to that of the parent body 2. This will enable that part of the blank which comprises the insert to have different mechanical properties to the remainder, a feature which may be required in the finished part, or in the forming process itself. In particular, making the insert thicker than the parent body will not only stiffen that part of the blank but also may compensate, wholly or in part, for any thinning which occurs during the forming process. Thus, by selecting an appropriate additional thickness before forming, a near uniform thickness can be achieved in the part after forming, even despite the different strain levels. Alternatively, the insert may be made of sufficient thickness to leave a thickened region in the formed part. Such a thickened region might be required for functional reasons, for example, to give greater strength or stiffness, or to provide for a threaded connection.

To facilitate FSW of an insert which is of different thickness, it is preferred to bring the thickness of the facing edge along the join line to be the same.

As well as or instead of making the insert of different thickness than the parent body, the surface of the insert may be contoured to provide a varying thickness across its area. Such contouring may be applied to one or both surfaces of the insert although usually the contoured face will be on the side that does not come into contact with the tool (i.e. it will be on the fluid side). Insofar as such contouring may result in the facing edges of the join line being of different thickness, it is desirable, as before, to bring these facing edges to the same thickness to facilitate the passage of the FSW tool.

It is envisaged that the blanks shown in FIGS. 1 to 5 may be used in a forming process utilising a heated mould and fluid pressure to stretch the blank into contact with the mould surface. The position, size and shape of the insert 3 will be such that that part of the blank which comprises the parent body 2 will be brought into contact with that part of the mould whose geometry is such that it requires only a modest strain in the blank (within the capabilities of the parent body) whereas that part of the blank which comprises the insert will be brought into contact with that part of the mould whose geometry requires a higher strain which is not within the capabilities of the material of the parent body (for example because such strain would result in excessive thinning or require protracted forming times) but can be formed successfully from the more expensive superplastic material of the insert. The benefit is thus that the cost of the composite blank (parent body 2+insert 3) will be less than a blank fabricated wholly from the more expensive superplastic material. Currently many parts formed from superplastic materials have only relatively small local regions, often amounting to less than 10% of the total area of the blank, where significant strain (for example greater than 50%) is needed to create the geometry of the desired part.

There will now be described, with reference to FIGS. 6 and 7, a typical sequence of operations in forming a shaped part in accordance with the method of the invention. The part to be formed is illustrated diagrammatically in FIG. 7, in which the hatched region 5 containing sharp curves and corners is assumed to be one which, during the forming process, will cause high strain in the material to be used to fabricate the part.

The first step in the process (FIG. 6A) is to select a suitable piece 6 of sheet material to form the parent body 2. A piece 7 of material is then cut out of the sheet 6 (FIG. 6B) to leave a correspondingly-shaped hole 8 in sheet 6.

Meanwhile a sheet 9 of a material exhibiting superplastic properties is selected and a piece 10 is cut from this sheet, corresponding in size and shape to the hole 8 in sheet 6 (FIG. 6C). It is assumed that the remaining pieces cut out of the sheet 9 will be used to fabricate subsequent blanks. A section 11-11 through piece 10 is represented by the dotted frame 11. As detailed in enlargement 12, the piece 10 may optionally have a contoured surface 16, providing additional thickness at 13, for example to compensate for local thinning, as explained above.

The piece 10 is now fitted into the hole 8 and welded in place to complete the blank 1 using FSW (FIG. 6D). Thus it will be seen that the piece 6 of FIG. 6B becomes the parent body 2 of the blank 1, and the piece 10 of FIG. 6C becomes the insert 3 of the blank 1.

The completed blank 1 is now placed over a mould 14 having a cavity 15 shaped to correspond to the part to be formed (FIG. 6E). It will be noted that the insert 3 is positioned so as to correspond to the region 5 in the part to be formed. Usually, the blank is clamped around its edges before fluid pressure, as represented by arrows A,B is now applied to stretch the material of the blank into the mould cavity 15 (FIG. 6F), thus producing the shape required, as shown in section on the right-hand side of FIG. 6F. It will be seen that, during this forming process, part of the parent body is deformed, but not to an extent beyond that of which it is capable. For this purpose, the inherent plasticity of the material of the parent body may be relied upon, or it may be enhanced by treating it to give a level of superplasticity sufficient to enable it to undergo the deformation required of it. It will be seen that a complex part might have several areas of different superplasticity, including some areas which do not exhibit superplasticity at all, these being fabricated with one or more inserts FSW welded into the parent body to provide a potentially quite complex distribution of levels of superplasticity across the blank. It will also be seen that it is possible to provide an insert within an insert to achieve such multiple levels of plasticity. The use of inserts makes such complex arrangements possible.

Figure 8:
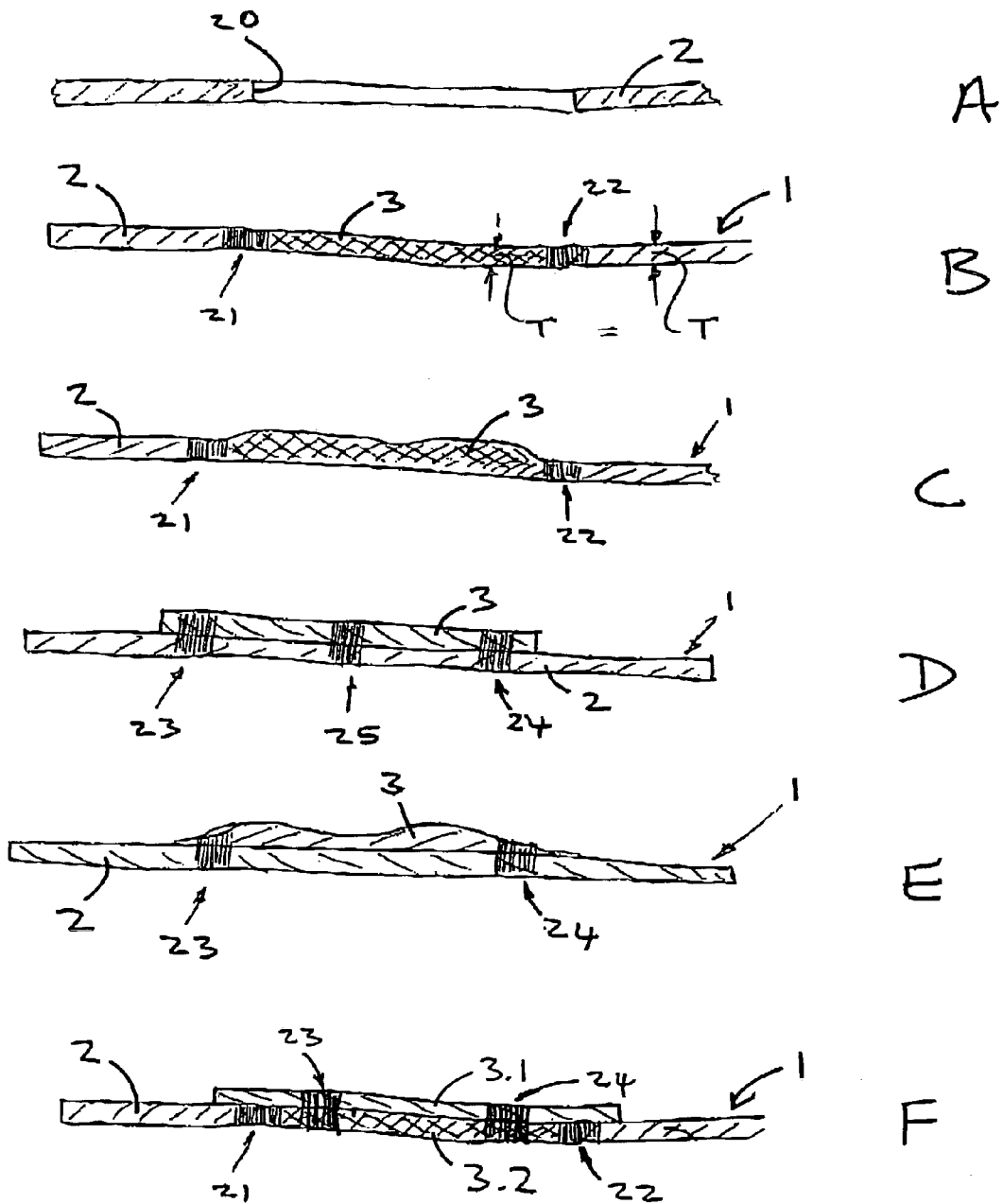

Referring now to FIG. 8, there are shown a series of views intended to clarify the various ways in which an insert 3 can be fitted to a parent body 2 to fabricate a blank 1 in sheet form. FIG. 8A shows the parent body 2 having a prepared hole 20 to receive the insert 3. FIG. 8B shows the insert after fitting, and illustrates at 21,22 the weld areas created by FSW. It will be noted that the thickness T of the insert is the same as that of the parent body. FIG. 8C shows a view similar to that of FIG. 8B, but in which the upper surface of the insert is contoured, as discussed above. FIG. 8D shows the joining of an insert 3 in the form of a patch onto the parent body 2 in order to create a layered structure. References 23 and 24 show the FSW welds required to effect joining. Reference 25 shows a further optional weld which may be needed for added strength and/or where the insert is of a larger size. FIG. 8E is similar to FIG. 8D, but shows an insert in the form of a patch having a contoured upper surface. FIG. 8F shows the joining of an insert 3.1 in the form of a patch over an existing insert 3.2 such as illustrated in FIG. 8B in order to form a layered insert. Advantageously both parts 3.1 and 3.2 of the layered insert have a similar level of superplasticity so that the performance of one part does not impair the other. References 21 to 24 shows the various FSW welds which are used to attach the insert part 3.2 to the parent body (welds 21,22) and to attach the insert part 3.1 to the insert part 3.2 (welds 23,24) although the welds may be arranged differently, as required.

There now follows some non-limiting examples of combinations of parent body/insert materials that could be used in the present invention. In each case the materials are aluminium alloy sheet identified using their Aluminum Association international alloy designations, that on the left being the parent body, that on the right, the insert:

(i) Standard AA 5083 to Superplastic AA 5083
(ii) Standard AA 2024 to Superplastic AA 2004
(iii) Standard AA 7075 to Superplastic AA 7475
(iv) Standard AA 6061 to Superplastic AA 2004

Typical starting gauges might be 1.9 mm (0.075 inches) of standard AA 7075 (for the parent body), and a 4.45 mm (0.175 inches) contoured insert of superplastic AA 7475. In this example, the bulk of the superplastically formed blank has only 50% thickness strain apart from a local area, represented by the insert, where the strain level reaches 250%. This combination of starting gauges would result in a more uniform overall thickness after SPF of about 1.27 mm (i.e. no local "thinness" in the high strain region).

The insert may be made from exotic materials containing expensive alloying elements such as scandium as described in U.S. Pat. No. 5,055,257 that have greatly improved superplastic properties. Another alternative could be the alloys developed by Grimes et al at Imperial College London produced by rapid cooling of liquid aluminium alloys containing 0.5 to 1.0% Zr as described in the ESPRC Report GR/L43848.

The invention claimed is:

1. A method of preparing a blank for superplastic forming comprising:

providing an insert and a parent body, at least one of the insert and the parent body being made of material which homogeneously exhibits superplastic properties prior to the start of a friction stir welding process;

joining the provided insert and the provided parent body by friction stir welding; and wherein the material that homogeneously exhibits superplastic properties is capable of deforming at least 200% without fracturing.

2. A method as claimed in claim 1 wherein friction stir welding is carried out using a tool which is passed along the joint line between the insert and the parent body.

3. A method of preparing a blank for superplastic forming comprising:

providing an insert and a parent body, the parent body having a cutout into which the insert fits, at least one of the insert and the parent body made of a material which exhibits superplastic properties prior to the start of a friction stir welding process;

joining the insert and the parent body by friction stir welding; and wherein the material that exhibits superplastic properties is capable of deforming at least 200% without fracturing.

4. A method as claimed in claim 3 wherein said cutout opens into an edge of the parent body so that the insert, when joined to the parent body, forms at least part of the external edge of the blank.

5. A method as claimed in claim 3 wherein said cutout is closed, thus forming a hole passing through the parent body.

6. A method of forming a blank for superplastic forming comprising:
   providing an insert and a parent body, the insert being made of a first material which exhibits superplastic properties prior to the start of a friction stir welding process and the parent body being made of a second material which, prior to the start of a friction stir welding process, exhibits superplastic properties to a lesser extent than the first material;
   joining the insert and the parent body by friction stir welding; and
   wherein the first material and the second material are capable of deforming at least 200% without fracturing.

7. A method of forming a blank for superplastic forming comprising:
   providing multiple inserts and a parent body, one or more of at least one of the multiple inserts and the parent body being made of a material which exhibits superplastic properties prior to the start of a friction stir welding process, the at least one of the inserts having a different level of superplasticity than the parent body;
   joining the multiple inserts and the parent body by friction stir welding; and
   wherein the material that exhibits superplastic properties is capable of deforming at least 200% without fracturing.

8. A method of preparing a blank for superplastic forming, said method comprising steps of joining an insert to a parent body by means of friction stir welding, at least one of the parent body and the insert being made of a material which homogeneously exhibits superplastic properties prior to the start of the friction stir welding process; and wherein the material that exhibits superplastic properties has a minimum strain rate of $10^{-2} S^{-1}$.

9. A method of preparing a blank for superplastic forming, said method comprising the steps of:
   taking an insert and a parent body at least one of which is homogenously made of a material which has superplastic properties;
   bringing the insert and the parent body together to form a junction between the two;
   carrying out friction stir welding along the junction of the insert and the parent body to join the insert and the parent body to produce said blank; and
   wherein the material that exhibits superplastic properties has a minimum strain rate of $10^{-2} S^{-1}$.

10. A method of preparing a blank for superplastic forming, said method comprising the steps of:
   taking an insert and a parent body at least one which is made of a material which has superplastic properties;
   bringing the insert and the parent body together to form a junction between the two;
   carrying out friction stir welding along the junction of the insert and the parent body to join the insert and the parent body to produce said blank in the form of a composite material in which that part which corresponds to the insert has a different level of superplasticity than that part which corresponds to the parent body; and
   wherein the material that exhibits siperplastic properties is capable of deforming at least 200% without fracturing.

* * * * *